United States Patent
Medeiros et al.

(10) Patent No.: US 12,320,687 B2
(45) Date of Patent: Jun. 3, 2025

(54) SYSTEMS AND METHODS FOR REMOTE SENSING OF RIVER VELOCITY USING VIDEO AND AN OPTICAL FLOW ALGORITHM

(71) Applicant: Marquette University, Milwaukee, WI (US)

(72) Inventors: Henry Ponti Medeiros, Fox Point, WI (US); Walter Miller McDonald, Shorewood, WI (US); Jamir Shariar Jyoti, Milwaukee, WI (US); Spencer M. Sebo, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 353 days.

(21) Appl. No.: 17/791,654

(22) PCT Filed: Jan. 11, 2021

(86) PCT No.: PCT/US2021/012957
§ 371 (c)(1),
(2) Date: Jul. 8, 2022

(87) PCT Pub. No.: WO2021/142441
PCT Pub. Date: Jul. 15, 2021

(65) Prior Publication Data
US 2023/0083320 A1 Mar. 16, 2023

Related U.S. Application Data

(60) Provisional application No. 62/959,709, filed on Jan. 10, 2020.

(51) Int. Cl.
*G01F 1/7086* (2022.01)
*G01C 13/00* (2006.01)
(Continued)

(52) U.S. Cl.
CPC ......... *G01F 1/7086* (2013.01); *G01C 13/006* (2013.01); *G01P 5/001* (2013.01);
(Continued)

(58) Field of Classification Search
CPC ......... G01F 1/7086; G06T 2207/30181; G06T 2207/20084; G06T 2207/20081; G06T 7/20; G01P 5/001; G01C 13/006
See application file for complete search history.

(56) References Cited

U.S. PATENT DOCUMENTS 10,852,421 B1 * 12/2020 Chartrand ............... G06T 5/70
2005/0018882 A1 * 1/2005 Muste .................. G01F 1/002
382/107

(Continued)

FOREIGN PATENT DOCUMENTS

CN 106156734 A 11/2016
KR 101996992 B1 7/2019

OTHER PUBLICATIONS

Arshad B, Ogie R, Barthelemy J, Pradhan B, Verstaevel N, Perez P. Computer Vision and IoT-Based Sensors in Flood Monitoring and Mapping: A Systematic Review. Sensors (Basel). Nov. 16, 2019;19(22):5012. doi: 10.3390/s19225012. PMID: 31744161; PMCID: PMC6891459. (Year: 2019).*

(Continued)

*Primary Examiner* — John Villecco
*Assistant Examiner* — Alexander John Rodgers
(74) *Attorney, Agent, or Firm* — Quarles & Brady LLP

(57) ABSTRACT

Described here are systems and methods that utilize visual imagery and an optical flow-based computer vision algorithm to measure river velocity in streams or other flowing bodies of water. The systems and methods described in the present disclosure overcome the barriers of conventional (Continued)

flow measurement techniques by providing a fast, non-intrusive, remote method to measure peak flows.

18 Claims, 7 Drawing Sheets

(51) Int. Cl.
     G01P 5/00          (2006.01)
     G06T 7/20          (2017.01)

(52) U.S. Cl.
     CPC ...... *G06T 7/20* (2013.01); *G06T 2207/20081* (2013.01); *G06T 2207/20084* (2013.01); *G06T 2207/30181* (2013.01)

(56) References Cited

U.S. PATENT DOCUMENTS

| | | | |
|---|---|---|---|
| 2012/0020527 A1* | 1/2012 | Abileah | G06V 20/13 |
| | | | 382/106 |
| 2012/0078517 A1* | 3/2012 | Bogucki | G01S 17/88 |
| | | | 702/50 |
| 2015/0090049 A1* | 4/2015 | Kertesz | G01F 1/7086 |
| | | | 429/61 |
| 2017/0036771 A1 | 2/2017 | Woodman et al. | |
| 2017/0184417 A1* | 6/2017 | Pedreiro | G01D 4/002 |
| 2018/0217256 A1* | 8/2018 | Stokes | G01K 13/00 |
| 2019/0005658 A1 | 1/2019 | Zamalloa et al. | |
| 2020/0150045 A1* | 5/2020 | Harasak | G01N 21/85 |
| 2020/0217702 A1* | 7/2020 | McFall | G01P 5/241 |
| 2022/0114809 A1* | 4/2022 | Zuniga Zamalloa | |
| | | | G06V 20/182 |
| 2022/0349738 A1* | 11/2022 | Meribout | G06T 7/20 |

OTHER PUBLICATIONS

Koutalakis P, Tzoraki O, Zaimes G. UAVs for Hydrologic Scopes: Application of a Low-Cost UAV to Estimate Surface Water Velocity by Using Three Different Image-Based Methods. Drones. 2019; 3(1):14. https://doi.org/10.3390/drones3010014 (Year: 2019).*

Sun, Deqing, et al. "Pwc-net: Cnns for optical flow using pyramid, warping, and cost volume." Proceedings of the IEEE conference on computer vision and pattern recognition. 2018. (Year: 2018).*

Fujita I. Discharge Measurements of Snowmelt Flood by Space-Time Image Velocimetry during the Night Using Far-Infrared Camera. Water. 2017; 9(4):269. https://doi.org/10.3390/w9040269 (Year: 2017).*

Touvron, Hugo, et al. "Fixing the train-test resolution discrepancy." Advances in neural information processing systems 32 (2019). (Year: 2019).*

Aguilar et al., Benchmarking laboratory observation uncertainty for in-pipe storm sewer discharge measurements, Journal of Hydrology, 2016, 534:73-86.

Aslani et al., Optical flow based moving object detection and tracking for traffic surveillance, World Academy of Science, Engineering and Technology, International Journal of Electrical and Computer Engineering, 2013, 7 (9):1252-1256.

Baccouche et al., Sequential deep learning for human action recognition, Human Behavior Understanding: Second International Workshop, LNCS 7065, Proceedings 2, Springer-Verlag Berlin Heidelberg, 2011, pp. 29-39.

Baker et al., A database and evaluation methodology for optical flow, International Journal of Computer Vision, 2011, 92(1):1-31.

Bjerklie et al., Estimating discharge in rivers using remotely sensed hydraulic information, Journal of Hydrology, 2005, 309(1-4):191-209.

Bolognesi et al., Measurement of surface velocity in open channels using a lightweight remotely piloted aircraft system, Geomatics, Natural Hazards and Risk, 2017, 8(1):73-86.

Butler et al., A naturalistic open source movie for optical flow evaluation, Computer Vision—ECCV 2012: 12th European Conference on Computer Vision, LCNS 7577, Proceedings, Part VI 12, Springer-Verlag Heidelberg, 2012, pp. 611-625.

Corpetti et al., Fluid experimental flow estimation based on an optical-flow scheme, Experiments in Fluids, 2006, 40 (1):80-97.

Dias et al., Semantic segmentation refinement by monte carlo region growing of high confidence detections, arXiv preprint arXiv:1802.07789, 2018, 9 pages.

Dirmeyer et al., The "maya express": floods in the US Midwest, Eos, Transactions, American Geophysical Union, 2009, 90(12):101-102.

DJI, Matrice 200 Series V2, M210 V2 / M210 Rtk V2, User Manual, 2019, 77 pages.

Dong, Remote sensing, hydrological modeling and in situ observations in snow cover research: A review, Journal of Hydrology, 2018, 561:573-583.

Dosovitskiy et al., Flownet: Learning optical flow with convolutional networks, Computer Vision Foundation, Proceedings of the IEEE International Conference on Computer Vision, Open Access, 2015, pp. 2758-2766.

Eltner et al., Flow velocity and discharge measurement in rivers using terrestrial and unmanned-aerial-vehicle imagery, Hydrology and Earth System Sciences, Preprint, Discussion Started: Jun. 25, 2019, pp. 1-20.

Fan et al., End-to-end learning of motion representation for video understanding, Computer Vision Foundation, Proceedings of the IEEE Conference on Computer Vision and Pattern Recognition, Open Access, 2018, pp. 6016-6025.

Flynn et al., Remote sensing of submerged aquatic vegetation in a shallow non-turbid river using an unmanned aerial vehicle, Remote Sensing, 2014, 6(12):12815-12836.

Fujita et al., Large-scale particle image velocimetry for flow analysis in hydraulic engineering applications, Journal of Hydraulic Research, 1998, 36(3):397-414.

Glomb et al., An optical flow-based method for velocity field of fluid flow estimation, Optical Measurement Systems for Industrial Inspection X, Proc. Of SPIE, 2017, vol. 10329, pp. 1-11.

Heitz et al., Variational fluid flow measurements from image sequences: synopsis and perspectives, Experiments in Fluids, 2010, 48(3):369-393.

Honkanen et al., Background extraction from double-frame PIV images, Experiments in Fluids, 2005, 38:348-362.

Horn et al., Determining optical flow, Artificial Intelligence, 1981, 17(1-3):185-203.

ILG et al., Flownet 2.0: Evolution of optical flow estimation with deep networks, Computer Vision Foundation, Proceedings of the IEEE International Conference on Computer Vision and Patern Recognition, Open Access, 2017, pp. 2462-2470.

Jahanmiri, Research Report 2011:03, Particle image velocimetry: Fundamentals and its applications, Chalmers University of Technology, Division of Fluid Dynamics, Department of Applied Mechanics, 2011, pp. 1-58.

Jain et al., Fusionseg: Learning to combine motion and appearance for fully automatic segmentation of generic objects in videos, Computer Vision Foundation, Proceedings of the IEEE Conference on Computer Vision and Pattern Recognition, 2017, pp. 3664-3673.

Jyoti et al., Remote sensing of river velocity using drone video and optical flow algorithm, Watershed Management Conference 2020, American Society of Civil Engineers, 2020, pp. 197-204.

Kale et al., Moving object tracking using optical flow and motion vector estimation, 2015 4th International Conference on Reliability, Infocom Technologies and Optimization (ICRITO) (Trends and Future Directions), IEEE, 2015, 7 pages.

Khalid et al., Application of optical flow for river velocimetry, 2017 IEEE International Geoscience and Remote Sensing Symposium (IGARSS), IEEE, 2017, 5 pages.

Kinzel et al., sUAS-based remote sensing of river discharge using thermal particle image velocimetry and bathymetric lidar, Remote Sensing, 2019, 11(19):2317, pp. 1-19.

Kondermann et al., The hci benchmark suite: Stereo and flow ground truth with uncertainties for urban autonomous driving,

(56) References Cited

OTHER PUBLICATIONS

Computer Vision Foundation, Proceedings of the IEEE Conference on Computer Vision and Pattern Recognition Workshop, 2016, pp. 19-28.

Le Coz et al., Uncertainty in open-channel discharges measured with the velocity-area method, Flow Measurement and Instrumentation, 2012, 26:18-29.

Lecun et al., Review: Deep learning, Nature, 2015, 521(7553):436-444.

Lee et al., Wireless sensor network design for tactical military applications: Remote large-scale environments, MILCOM 2009, 2009 IEEE Military Communications Conference, IEEE, 2009, pp. 1-7.

Legleiter et al., Remote measurement of river discharge using thermal particle image velocimetry (PIV) and various sources of bathymetric information, Journal of Hydrology, 2017, 554:490-506.

Lenhart et al., Automatic traffic monitoring based on aerial image sequences, Pattern Recognition and Image Analysis, 2008, 18:400-405.

Levesque et al., Computing discharge using the index velocity method, Techniques and Methods 3-A23, U.S. Department of the Interior, U.S. Geological Survey, 2012, 162 pages [In Three Parts Due to File Size].

Lewis et al., LSPIV measurements of two-dimensional flow structure in streams using small unmanned aerial systems: 2. Hydrodynamic mapping at river confluences, Water Resources Research, 2018, 54(10):7981-7999.

Lottes et al., UAV-based crop and weed classification for smart farming, 2017 IEEE International Conference on Robotics and Automation (ICRA), IEEE, 2017, 8 pages.

Mallakpour et al., Investigating the relationship between the frequency of flooding over the central United States and large-scale climate, Advances in Water Resources, 2016, 92:159-171.

Mallakpour et al., Analysis of changes in the magnitude, frequency, and seasonality of heavy precipitation over the contiguous USA, Theoretical and Applied Climatology, 2017, 130(1-2):345-363.

Mcdonald, Drones in urban stormwater management: a review and future perspectives, Urban Water Journal, 2019, 16(7):505-518.

Melling, Tracer particles and seeding for particle image velocimetry, Measurement Science and Technology, 1997, 8(12):1406-1416.

Menze et al., Object scene flow for autonomous vehicles, Computer Vision Foundation, Proceedings of the IEEE Conference on Computer Vision and Pattern Recognition, Open Access, 2015, pp. 3061-3070.

Mozhdehi et al., Deep convolutional particle filter for visual tracking, 2017 IEEE International Conference on Image Processing (ICIP), IEEE, 2017, 5 pages.

Muste et al., Large-scale particle image velocimetry for measurements in riverine environments, Water Resources Research, 2008, 44(4):1-14.

NOAA, National Centers for Environmental Information (NCEI), Billion-Dollar Weather and Climate Disasters: Overview, Retrieved from https://web.archive.org/web/20180125061320/https://www.ncdc.noaa.gov/billions/, 2018, 3 pages.

NOAA, National Centers for Environmental Information (NCEI), Billion-Dollar Weather and Climate Disasters: Events, 1980-2019, Retrieved from https://www.ncei.noaa.gov/access/billions/events/US/1980-2019, Version Accessed on Aug. 30, 2023, 45 pages.

Ohnishi et al., Dominant plane detection from optical flow for robot navigation, Pattern Recognition Letters, 2006, 27 (9):1009-1021.

Pietroniro et al., Applications of remote sensing in hydrology, Hyrological Processes, 2002, 16(8):1537-1541.

Pizarro et al., Identifying the Optimal Spatial Distribution of Tracers for Optical Sensing of Stream Surface Flow, Hydrology and Earth System Sciences, 2020, 24:5173-5185.

Plant et al., Measurement of river surface currents with coherent microwave systems, IEEE Transactions on Geoscience and Remote Sensing, 2005, 43(6):1242-1257.

Raffel et al., Chapter 6—Post-processing of PIV data, Particle Image Velocity: A Practical Guide, 2007, pp. 177-208.

Raj et al., Autonomous quadcopter navigation using vision-based landmark recognition, 2018 Aviation Technology, Integration, and Operations Conference, 2018, pp. 1-12.

Ranjan et al., Optical flow estimation using a spatial pyramid network, Computer Vision Foundation, Proceedings of the IEEE Conference on Computer Vision and Pattern Recognition, 2017, pp. 4161-4170.

Restas, Drone applications for supporting disaster management, World Journal of Engineering and Technology, 2015, 3(3):316-321.

Shi et al., Review of snow water equivalent microwave remote sensing, Science China Earth Sciences, 2016, 59:731-745.

Silar et al., Comparison of two optical flow estimation methods using Matlab, 2011 International Conference on Applied Economics, IEEE, 2011, pp. 1-4.

Sim et al., Human motion tracking of athlete using optical flow & artificial markers, 2010 International Conference on Intelligent and Advanced Systems, IEEE, 2020, pp. 1-4.

Strelnikova et al., Drone-based optical measurements of heterogeneous surface velocity fields around fish passages at hydropower dams, Remote Sensing, 2020, 12(3):384, pp. 1-25.

Stumph et al., Detecting invasive insects with unmanned aerial vehicles, arXiv preprint arXiv:1903.00815, 2019, 7 pages.

Sutarto, Application of large scale particle image velocimetry (LSPIV) to identify flow pattern in a channel, Procedia Engineering, 2015, 125:213-219.

Tauro et al., Assessment of drone-based surface flow observations, Hydrological Processes, 2016, 30(7):1114-1130.

Tauro, Particle tracers and image analysis for surface flow observations, Wiley Interdisciplinary Reviews: Water, 2016, 3(1):25-39.

Tauro et al., Surface flow measurements from drones, Journal of Hydrology, 2016, 540:240-245.

Tazioli, Experimental methods for river discharge measurements: comparison among tracers and current meter, Hydrological Sciences Journal, 2011, 56(7):1314-1324.

Tsai et al., Video segmentation via object flow, Computer Vision Foundation, Proceedings of the IEEE Conference on Computer Vision and Pattern Recognition, 2016, pp. 3899-3908.

UAV Coach, Drone Laws in Wisconsin (2020): A List of Drone Regulations and Links for People Flying Drones in Wisconsin, Retrieved from https://uavcoach.com/drone-laws-wisconsin/#:~:text=No%20person%20shall%20launch%20or,a%20manner%20so%20as%20to, 2020, 6 pages.

U.S. Geological Survey (USGS): Science for a Changing World, U.S. Department of the Interior, USGS 04087120 Menomonee River at Wauwatosa, WI, Retrieved from http://web.archive.org/web/20201116133856/https://waterdata.usgs.gov/usa/nwis/uv?04087120, 2020, 4 pages.

U.S. Geological Survey (USGS): Science for a Changing World, U.S. Department of the Interior, Frequently Asked Questions, Science Technology, What is remote sensing and what is it used for?, Retrieved from https://www.usgs.gov/faqs/what-remote-sensing-and-what-it-used?qt-%20news_science_products=0#qt-news_science_products, Version Accessed on Aug. 5, 2024, 4 pages.

Vivoni et al., Ecohydrology with unmanned aerial vehicles, Ecosphere, 2014, 5(10):130, pp. 1-14.

Wikipedia, Particle Image Velocimetry, Retrieved from https://en.wikipedia.org/wiki/Particle_image_velocimetry, Version Accessed on Mar. 4, 2021, 13 pages.

Woodget et al., Drones and digital photogrammetry: from classifications to continuums for monitoring river habitat and hydromorphology, Wiley Interdisciplinary Reviews: Water, 2017, 4(4):e1222, pp. 1-20.

Yorke et al., Measuring river velocity and discharge with acoustic Doppler profilers, Flow Measurement and Instrumentation, 2002, 13(5-6):191-195.

Zhu et al., Image-preprocessing method for near-wall particle image velocimetry (PIV) image interrogation with very large in-plane displacement, Measurement Science and Technology, 2013, 24(12):125302, pp. 1-17.

European Patent Office, Extended European Search Report, Application No. 21738929.5, Jun. 17, 2024, 12 pages.

(56) References Cited

OTHER PUBLICATIONS

PCT International Search Report and Written Opinion, PCT/US2021/012957, Apr. 16, 2021, 7 pages.

* cited by examiner

SYSTEMS AND METHODS FOR REMOTE SENSING OF RIVER VELOCITY USING VIDEO AND AN OPTICAL FLOW ALGORITHM

CROSS-REFERENCE TO RELATED APPLICATIONS

This application represents the U.S. national stage entry of International Application No. PCT/US2021/012957 filed Jan. 11, 2011, which claims the benefit of U.S. Provisional Patent Application Ser. No. 62/959,709, filed on Jan. 10, 2020, and entitled "REMOTE SENSING OF RIVER VELOCITY USING DRONE VIDEO AND OPTICAL FLOW ALGORITHMS," which are herein incorporated by reference in their entirety.

BACKGROUND

Extreme floods cause more damages than any other type of natural event in the United States and are expected to get worse due to projected increase in intensity and frequency of extreme precipitation. Any solution to flooding issues must first be informed by accurate and reliable measurements of streamflow during floods. So, it is important to be able to accurately measure the surface flow of flowing water in river or any stream for flood prediction. In addition, the measurement of flow velocity can be useful for other applications like, such as monitoring how the flow will affect the living organisms and inhabitants in the stream and/or how the flow may affect buildings, bridges, or any other structures near the stream. In spite of its wide variety of applications, measuring stream velocity can be a challenging task to perform, especially if the flow is too strong or if there is large debris during the peak flood conditions.

Conventional stream flow measurements techniques use current meter or acoustic Doppler meters. Although these measurement techniques are accurate, they can be expensive and time consuming, and at the same time they require on-site presence, which in some cases is impossible or impractical, especially if there is a heavy flood. As these methods are limited to easy-to-access environments, there remains a need for noninvasive techniques to measure river flow.

There are some existing image-based flow measurement techniques called PIV (Particle Image Velocimetry) and LSPIV (Large Scale Particle Image Velocimetry) that have been applied successfully to drone videos of streamflow to track the velocity of water in streams, such as those described in Bolognesi, M., Farina, G., Alvisi, S., Franchini, M., Pellegrinelli, A., and Russo, P. (2017) Measurement of surface velocity in open channels using a lightweight remotely piloted aircraft system. *Geomatics, Nat. Hazards Risk*, 8, 73-86; Tauro, F., Porfiri, M., and Grimaldi, S. (2016a) Surface flow measurements from drones. J. Hydrol. 540, 240-245; and Tauro, F., Petroselli, A., and Arcangeletti, E. (2016b) Assessment of drone-based surface flow observations. *Hydrol. Process*. 30, 1114-1130.

In the Particle based tracking system, a particle is tracked throughout the stream. Basically, a displacement of a particle or the location of a specific region is observed more than once for the velocity estimation. LSPIV (Large Scale Particle Image Velocimetry) is an extended version of the PIV method where a large number of particles are being tracked throughout the stream. These remote approaches have their limitations. For instance, it can be easy to lose track of the particle and they cannot do a real-time analysis. Also, for LSPIV, flow absent of large debris has to be externally seeded.

Watershed models of extreme flooding events require accurate and reliable measurements of streamflow for calibration and validation. However, flow rate measurements during floods are inherently uncertain, and physical measurements of velocity during flood conditions are prohibitive in many cases. Therefore, novel methods to measure stream velocity during extreme floods should be considered.

SUMMARY OF THE DISCLOSURE

The present disclosure addresses the aforementioned drawbacks by providing a system and method for measuring stream flow velocity. Image data (e.g., video image data) of a flowing water source are acquired with a camera, which may be coupled to an unmanned aerial vehicle ("UAV"), such as a drone, or otherwise coupled at a stationary position above a flow surface of the flowing water source. The image data are transmitted to a computer system that is remote from the UAV. At the computer system, the image data are input to a trained machine learning algorithm stored on the computer system, generating output as water flow (e.g., stream flow, river flow, sewer pipe flow, open channel water flow) velocity data, wherein the trained machine learning algorithm implements an optical flow algorithm.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1:
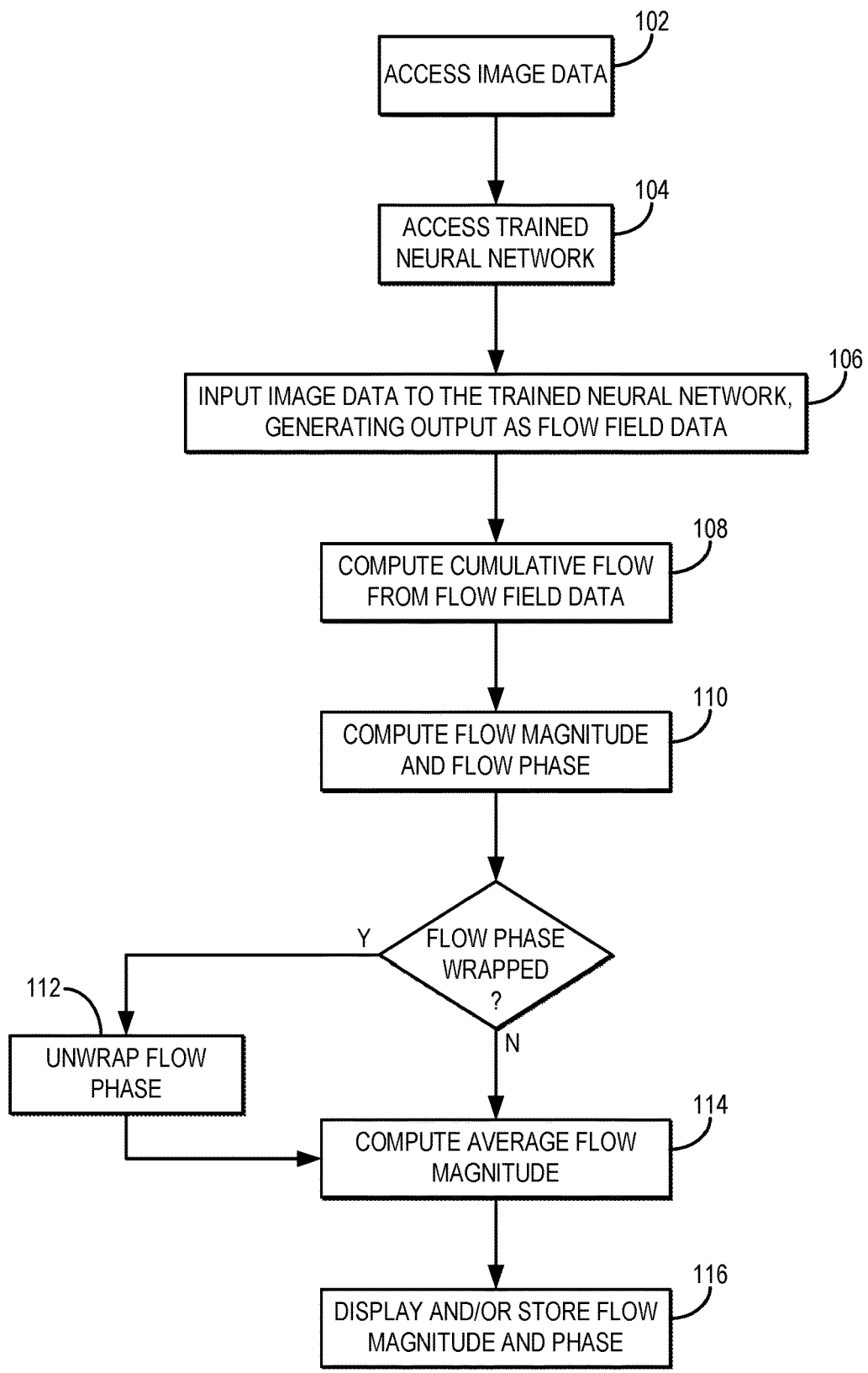
FIG. 1 is a flowchart setting forth the steps of an example method for estimating flow velocity measurements according to some embodiments described in the present disclosure.

Described here are systems and methods that utilize image data (e.g., video data) and an optical flow-based computer vision algorithm to measure flow velocity in rivers, streams, or other bodies of water. The image data can be obtained with a camera coupled to a drone (or other unmanned aerial vehicle) or coupled to a stationary point (e.g., a bridge, a pole) above the flow surface of the flowing water source. As one advantageous example, flow velocity can be measured in streams during extreme floods. The systems and methods described in the present disclosure overcome the barriers of conventional flow measurement techniques by providing a fast, non-intrusive, remote method to measure stream peak flows.

In general, optical flow is the displacement of pixels between two consecutive image frames. For instance, optical flow can be measured as the apparent motion of image objects between two consecutive frames caused by the movements of objects or camera. The optical flow field is a two-dimensional vector field where each vector is a displacement vector showing the movement of points from the first frame to the second frame.

The systems and methods described in the present disclosure provide improvements over conventional stream flow measurement systems by providing a system that utilizes video imaging and optical flow algorithms to measure velocity in rivers and streams.

To remotely sense streamflow, a drone, (e.g., a DJI Matrice 210 RTK drone) equipped with a camera (e.g., a Zenmuse X5S camera) can be used to capture image data (e.g., video data containing a series of consecutive image frames). River velocity can be measured by inputting the image data to an optical flow algorithm, generating output as flow velocity data. As one example, the optical flow algorithm can include a machine learning algorithm that implements an optical flow algorithm, such as a PWC-Net, which is described in Sun, D., Yang, X., Liu, M. Y., & Kautz, J. (2018). PWC-Net: CNNs for optical flow using pyramid, warping, and cost volume. *In Proceedings of the IEEE Conference on Computer Vision and Pattern Recognition* (pp. 8934-8943), which is herein incorporated by reference in its entirety.

In some embodiments, an aerial imaging technique for surface flow measurement can use a computer vision algorithm called optical flow, which as noted above, measures or otherwise computes the motion or displacement of image pixels between two consecutive image frames. The classical optical flow formulation is based on the following two assumptions: a brightness constancy assumption and a spatial smoothness assumption. The brightness constancy assumption assumes that the pixel intensities of an object between two consecutive frames do not change. The spatial smoothness assumption assumes that neighboring pixels tend to have similar motion.

If the intensity of a pixel in the first frame is $I(x, y, t)$ and its displacement is $(dx, dy)$ in the next frame after time $dt$, according to the brightness constancy assumption it can be said that:

$$I(x,y,t)=I(x+dx,y+dy,t+dt) \quad (1);$$

Therefore, for a single point in a vector field, its movement can be defined according to the following optical flow constraint equation:

$$\frac{\partial I}{\partial x}f_x + \frac{\partial I}{\partial y}f_y + \frac{\partial I}{\partial z}f_z = 0; \quad (2)$$

where $f_x$ and $f_y$ represent the velocity of a point along the x and y directions, respectively.

Except for the classical formulation, some other networks have been developed for optical flow estimation based on deep neural networks. One example of such a network is a deep neural network-based algorithms for optical flow estimation called PWC-Net, as mentioned above. PWC-Net takes consecutive image frames of the stream flow video as input and outputs the corresponding optical flow field, $(f_x, f_y, t)$. From the optical flow data generated on each image pair by PWC-Net, the cumulative flow field, $(F_x, F_y)$ can be obtained in Cartesian coordinates. The cumulative flow field can be computed for a whole video by adding the Cartesian flow field of each image pair. The cumulative flow field data can then be converted to polar coordinate values to generate the flow magnitude ($\rho$) and phase ($\theta$) according to:

$$\rho=\sqrt{F_x^2+F_y^2} \quad (3);$$

$$\theta = \tan^{-1}\left(\frac{F_y}{F_x}\right). \quad (4)$$

The phase ($\theta$) in Eqn. (4) may be wrapped at this point, which means in those instances the phase is constrained between $-180°<\theta<180°$ and hence can show discontinuities at angles near the endpoints of this range. In these instances, phase unwrapping can be performed to provide a true azimuth in the direction of the stream. The average flow magnitude ($\bar{\rho}$) is given by the cumulative magnitude divided by the number of video frame pairs. The average magnitude ($\bar{\rho}$) represents the velocity of the flow in pixels per frame, and can be converted to meters per second according to:

$$\bar{\rho}_{mps}=\bar{\rho} \cdot ps \cdot fr \quad (5);$$

where "ps" is the size of a pixel in meters and "fr" is the frame rate of the video in frames per second. From the average of the distribution of the magnitude, $\bar{\rho}$, and the unwrapped phase, $\theta_u$, over the processed video segment, histograms and/or heat maps of both magnitude and phase can be generated for qualitative and quantitative analysis. As one example, quantitative analysis can be based on the mean, median, and/or mode values of the histograms over the flow region.

An example workflow for a river/stream flow velocity measurement using the methods described in the present disclosure is as follows:

---
Algorithm 1. Example algorithm for river flow estimation
---
Input: Sequence of images $I_i$, i = 1,2, ... , n to PWC-Net network.
Output: Average distribution of flow magnitude ($\bar{\rho}$) and phase ($\theta$).
1:   for each consecutive image pair ($I_t$, $I_{t+1}$) do
2:       compute flow field ($f_x$, $f_y$, t), (t = 1,2, ... , n−1) from PWC-Net
3:   end for
4:   Obtain the cumulative flow ($F_x$, $F_y$)=$\Sigma_{t=1}^{n-1}(f_x, f_y, t)$.
5:   Compute ($\rho$, $\theta$) from ($F_x$, $F_y$) using Eqns. (3) and (4).
6:   for each $\theta$ do
7:       if $\theta<0$ then
8:           compute unwrapped phase $\theta_u$ = $\theta$ + 360
9:       end if
10:  end for
11:  Calculate the average flow magnitude $\bar{\rho}$ = $\rho$/(n − 1)
12:  Convert magnitude $\bar{\rho}$ from pixels per second to meter per second using Eqn. (5).
---

Referring now to FIG. 1, a flowchart is illustrated as setting forth the steps of an example method for estimating river flow data (e.g., velocity) using a suitably trained neural network or other machine learning algorithm.

The method includes accessing image data with a computer system, as indicated at step 102. Accessing the image data may include retrieving such data from a memory or other suitable data storage device or medium. Alternatively, accessing the image data may include acquiring such data with an imaging system (e.g., a camera) and transferring or otherwise communicating the data to the computer system, which may be a part of the imaging system.

In general, the image data can include video data recorded with a camera or other imaging system, or may otherwise include a series of image frames obtained over a period of time. The image data can be optical, or visual, image data (e.g., images and/or video obtained in the visible spectrum), or multispectral image data, hyperspectral image data, thermal image data, and so on. In some implementations, the image data may contain more than one image type. For instance, the image data may include images (or video) obtained in the visible spectrum in addition to other spectra (e.g., hyperspectral, thermal). In these instances, the image data can be obtained using a single camera or imaging system that is capable of simultaneously recording image data in multiple different spectra, or across one broad spectrum, or may include multiple camera and/or imaging systems that are each configured to obtain image data in different spectra (e.g., a visual camera and a thermal imaging camera).

As one non-limiting example, the image data can include video data of a river, stream, or other flowing body of water, which may be collected using an unmanned aerial vehicle, such as a drone. For instance, the image data may include video data, such as video data filmed in 4K resolution at 30 frames per second. It will be appreciated that the video data may also be filmed in other resolutions or at other frames per second.

Additionally or alternatively, the image data may be acquired using a stationary camera or imaging system, such as a camera or imaging system coupled to a stationary position like a bridge or pole. For example, the camera or imaging system may be mounted or otherwise coupled to the side or underside of a bridge in order to obtain image data of the water flowing underneath the bridge.

In still other embodiments, the image data may be obtained using a combination of stationary and non-stationary cameras and/or imaging systems. For example, the image data may include first image data obtained using a camera coupled to a drone or other UAV, and second image data obtained using a fixed mount camera (e.g., a camera mounted to a bridge, pole, or other stationary position). In these examples, the first image data and the second image data may be the same type of image data (e.g., both visible spectrum images or video), or may be different types of image data (e.g., the first image data may be visible spectrum images or video and the second image data may be thermal images or video).

Preferably, the image data are obtained in combination with location data, such as global positioning system ("GPS") or other global navigation satellite system ("GNSS") data. In this way, accessing the image data may also include accessing location data. As an example, obtaining the image data together with such location data allows for positional accuracy through the combination of drone and ground-based GPS satellite receivers (e.g., centimeter-level accuracy). For instance, based on this positional accuracy, the drone can hover steadily in typical environmental conditions within ±0.1 m, which can be advantageous for the accurate estimation of pixel size in videos as it allows for data collection at steady elevations.

A trained neural network (or other suitable machine learning algorithm) is then accessed with the computer system, as indicated at step 104. Accessing the trained neural network may include accessing network parameters (e.g., weights, biases, or both) that have been optimized or otherwise estimated by training the neural network on training data. In some instances, retrieving the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the neural network is trained, or has been trained, on training data in order to estimate flow field data from image data, such as video data, based on an optical flow algorithm.

Figure 2:
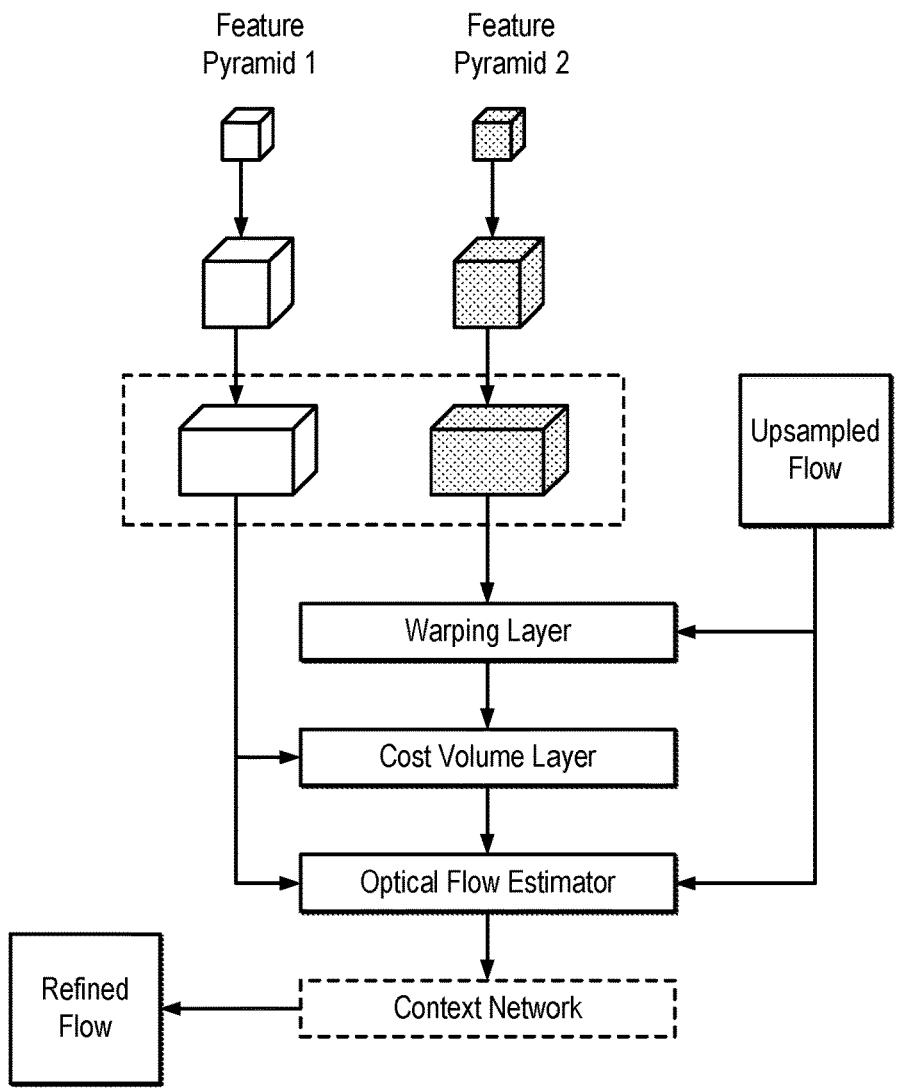
FIG. 2 shows an example PWC-Net neural network architecture, which can be used to estimate flow velocity from a series of image frames and/or video data.

As one non-limiting example, the trained neural network may be a PWC-Net. An example PWC-Net architecture is shown in FIG. 2. In general, the PWC-Net architecture makes use of feature pyramids, one or more warping layers, and one or more cost volume layers. The feature pyramids can implement fixed image pyramids or learnable feature pyramids. The warping layer(s) can be used to estimate large motion, and the cost volume layer(s) can be used as a representation of the optical flow. The cost volume can, therefore, be processed by neural network layers, which may include convolutional neural network ("CNN") layers, in order to estimate the flow. Advantageously, the warping and cost volume layers can be constructed to not have learnable parameters, thereby reducing the overall trained model size.

In some implementations, a context network can be used to refine the optical flow using contextual information, such as median filtering and bilateral filtering. As one example, the context network can be implemented as a feed-forward CNN with a design based on dilated convolutions.

The image data are then input to the one or more trained neural networks, generating output as flow field data, as indicated at step 106.

The cumulative flow is then computed from the flow field data, as indicated at step 108. As an example, the cumulative flow can be computed by adding the Cartesian flow field of each pair of images in the image data, as described above.

From the cumulative flow, the flow magnitude and flow phase are computed, as indicated at step 110. For example, the flow magnitude can be computed using Eqn. (3), and the flow phase can be computed using Eqn. (4). As noted above, in some instances the computed flow phase may be phase wrapped. In these instances, the flow phase can be unwrapped, as indicated at step 112.

The average flow magnitude can be computed, as indicated at step 114, and converted from pixels per second to meters per second (or another dimensional quantity), as indicated at step 116. For example, Eqn. (5) can be used to convert the average flow magnitude.

The resulting flow magnitude and flow phase data can be stored and/or displayed to a user, as indicated at step 118. For example, the flow magnitude and/or flow phase can be displayed as maps that depict the spatial distribution of the flow magnitude and/or flow phase values in the imaged field-of-view. As described, in some instances magnitude histograms and/or phase histograms can also be generated and stored and/or displayed to a user. Likewise, additional quantitative parameters can be computed from the maps (e.g., heatmaps), histograms, or both. Such quantitative parameters allow for quantitative analysis of the river or stream flow.

Figure 3:
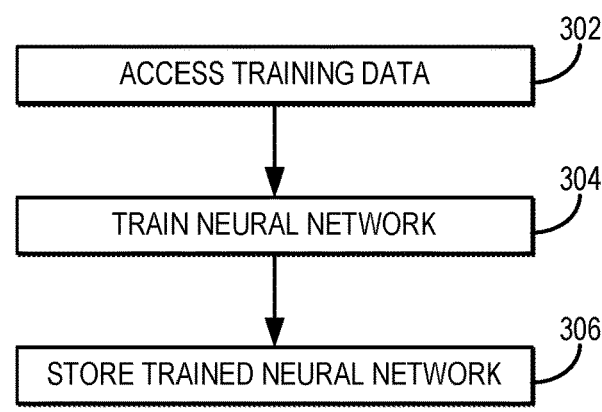
FIG. 3 is a flowchart setting forth the steps of an example method for training a neural network, such as a PWC-Net, to estimate flow velocity from a series of image frames and/or video data.

Referring now to FIG. 3, a flowchart is illustrated as setting forth the steps of an example method for training one or more neural networks (or other suitable machine learning algorithms) on training data, such that the one or more neural networks are trained to receive input as image data in order to generate output as flow field data.

In general, the neural network(s) can implement any number of different neural network architectures. For instance, the neural network(s) could implement a convolutional neural network, a residual neural network, and so on. In some instances, the neural network(s) may implement deep learning. As described above, as one non-limiting example, the neural network can implement a PWC-Net architecture, such as the one shown in FIG. 2.

Alternatively, the neural network(s) could be replaced with other suitable machine learning algorithms, such as those based on supervised learning, unsupervised learning, deep learning, ensemble learning, dimensionality reduction, and so on.

The method includes accessing training data with a computer system, as indicated at step 302. Accessing the training data may include retrieving such data from a memory or other suitable data storage device or medium. Alternatively, accessing the training data may include acquiring such data with an imaging system and transferring or otherwise communicating the data to the computer system, which may be a part of the imaging system.

In general, the training data can include image data, such as video data. In some instances, the training data may have a lower spatial resolution than the image data that will be acquired and input into the trained neural network. For instance, although the image data input to the trained neural network may be obtained with a 4K resolution, the training data may have a lower resolution, such as a 1K resolution. In some instances, the training data may have a higher spatial resolution, but can be resampled to a lower resolution as indicated above.

In some implementations, the training data may be augmented, such as by generating cloned data by making copies of the training data while altering or modifying each copy of the training data. For instance, cloned data can be generated using data augmentation techniques, such as adding noise to the original training data, performing a deformable transformation (e.g., translation, rotation, both) on the original training data, smoothing the original training data, applying a random geometric perturbation to the original training data, combinations thereof, and so on.

One or more neural networks (or other suitable machine learning algorithms) are trained on the training data, as indicated at step 304. In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). Training data can then be input to the initialized neural network, generating output as flow field data. The quality of the flow field data can then be evaluated, such as by passing the flow field data to the loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

In one non-limiting example, a multi-scale training loss can be implemented as:

$$L(\Theta) = \sum_{k=k_0}^{K} \alpha_k \sum_{x} |w_\Theta^k(x) - w_{GT}^k(x)|_2 + \gamma |\Theta|_2; \qquad (6)$$

where $\Theta$ is the set of learnable parameters, $w_\Theta^k$ is the flow field at the kth pyramid level predicted by the network, $w_{GT}^k$ is a supervision signal corresponding to the kth pyramid level, $|\cdot|_2$ is the $l_2$-norm, and $\gamma$ is a regularization parameter.

The one or more trained neural networks are then stored for later use, as indicated at step 306. Storing the neural network(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

Figure 4:
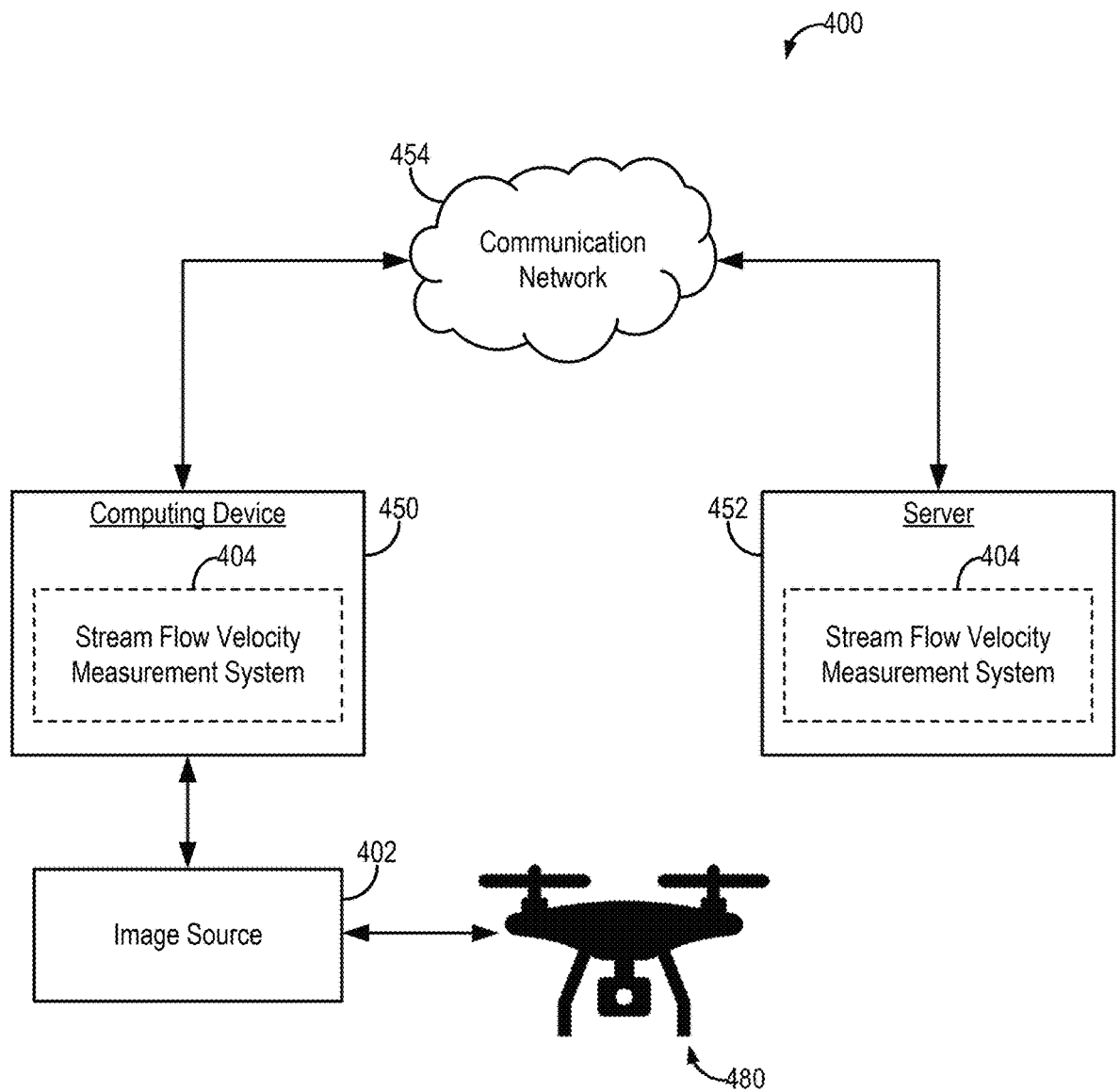
FIG. 4 is a block diagram of an example of a stream flow velocity measuring system in accordance with some embodiments of the present disclosure.

Referring now to FIG. 4, an example of a system 400 for measuring stream flow velocity from video image data in accordance with some embodiments of the systems and methods described in the present disclosure is shown. As shown in FIG. 4, a computing device 450 can receive one or more types of data (e.g., video image data) from image source 402. In some embodiments, computing device 450 can execute at least a portion of a stream flow velocity measurement system 404 to measure or otherwise estimate stream flow velocity from data received from the image source 402.

Additionally or alternatively, in some embodiments, the computing device 450 can communicate information about data received from the image source 402 to a server 452 over a communication network 454, which can execute at least a portion of the stream flow velocity measurement system 404. In such embodiments, the server 452 can return information to the computing device 450 (and/or any other suitable computing device) indicative of an output of the stream flow velocity measurement system 404.

In some embodiments, computing device 450 and/or server 452 can be any suitable computing device or combination of devices, such as a desktop computer, a laptop computer, a smartphone, a tablet computer, a wearable computer, a server computer, a virtual machine being executed by a physical computing device, and so on. The computing device 450 and/or server 452 can also reconstruct images from the data.

In some embodiments, image source 402 can be any suitable source of image data (e.g., video image frame data), such as a camera that is mounted or otherwise coupled to a drone or other such unmanned aerial vehicle ("UAV") 480, a camera or other imaging system that is coupled to a stationary position (e.g., a bridge, a pole), another computing device (e.g., a server storing image data), and so on. In some embodiments, image source 402 can be local to computing device 450. For example, image source 402 can be incorporated with computing device 450 (e.g., computing device 450 can be configured as part of a device for capturing, scanning, and/or storing images). As another example, image source 402 can be connected to computing device 450 by a cable, a direct wireless link, and so on. Additionally or alternatively, in some embodiments, image source 402 can be located locally and/or remotely from computing device 450, and can communicate data to computing device 450 (and/or server 452) via a communication network (e.g., communication network 454).

In some embodiments, communication network 454 can be any suitable communication network or combination of communication networks. For example, communication network 454 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 454 can be a local area network, a wide area network, a public network (e.g., the Internet), a private or semi-private network (e.g., a corporate or university intranet), any other suitable type of network, or any suitable combination of networks. Communications links shown in FIG. 4 can each be any suitable communications link or combination of communications links, such as wired links, fiber optic links, Wi-Fi links, Bluetooth links, cellular links, and so on.

Figure 5:
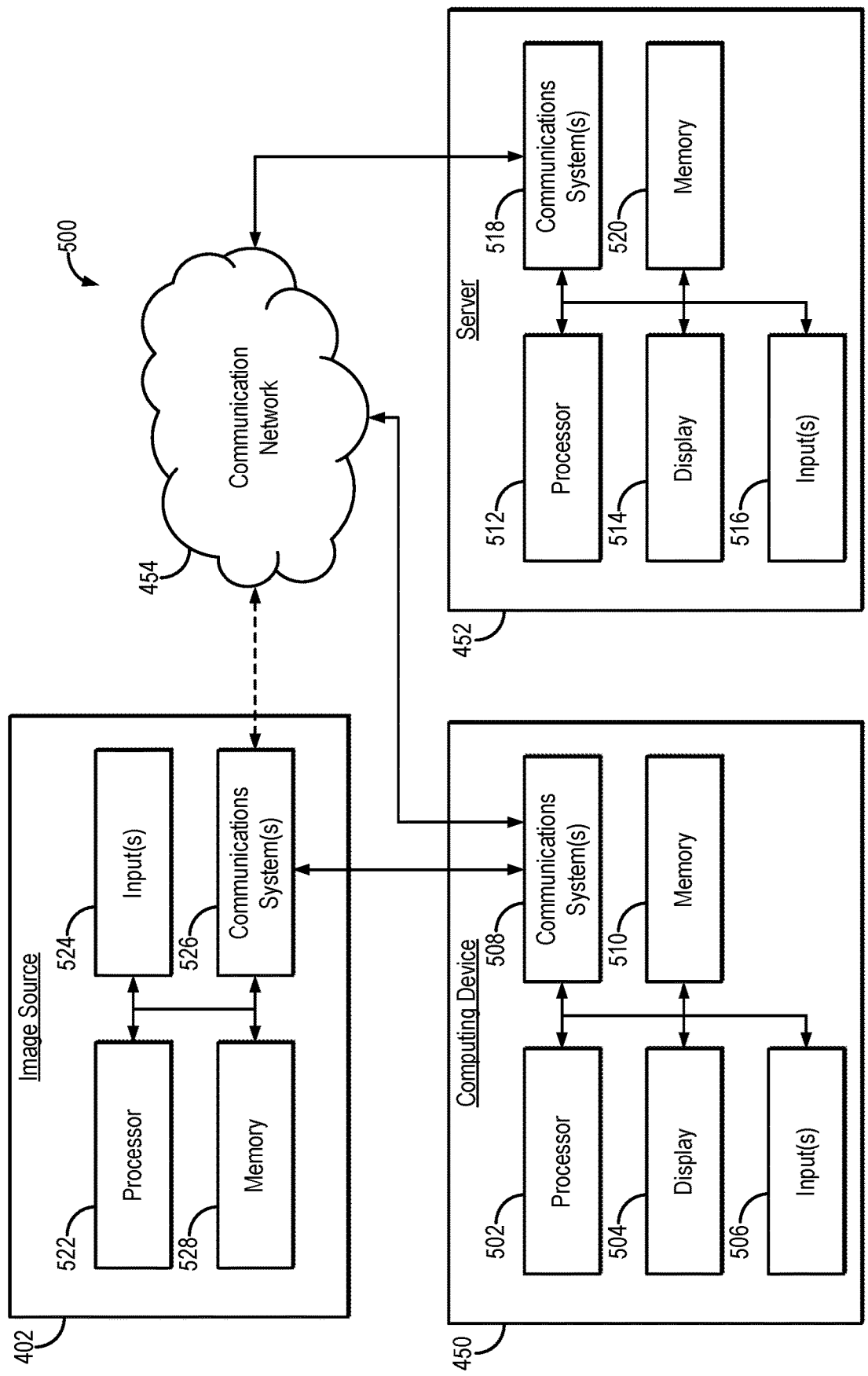
FIG. 5 is a block diagram of example components that can implement the system of FIG. 4.

Referring now to FIG. 5, an example of hardware 500 that can be used to implement image source 402, computing device 450, and server 452 in accordance with some embodiments of the systems and methods described in the present disclosure is shown. As shown in FIG. 5, in some embodiments, computing device 450 can include a processor 502, a display 504, one or more inputs 506, one or more communication systems 508, and/or memory 510. In some embodiments, processor 502 can be any suitable hardware processor or combination of processors, such as a central processing unit ("CPU"), a graphics processing unit ("GPU"), and so on. In some embodiments, display 504 can include any suitable display devices, such as a computer monitor, a touchscreen, a television, and so on. In some embodiments, inputs 506 can include any suitable input devices and/or sensors that can be used to receive user input, such as a keyboard, a mouse, a touchscreen, a microphone, and so on.

In some embodiments, communications systems 508 can include any suitable hardware, firmware, and/or software for communicating information over communication network 454 and/or any other suitable communication networks. For example, communications systems 508 can include one or more transceivers, one or more communication chips and/or chip sets, and so on. In a more particular example, communications systems 508 can include hardware, firmware and/or software that can be used to establish a Wi-Fi connection, a Bluetooth connection, a cellular connection, an Ethernet connection, and so on.

In some embodiments, memory 510 can include any suitable storage device or devices that can be used to store instructions, values, data, or the like, that can be used, for example, by processor 502 to present content using display 504, to communicate with server 452 via communications system(s) 508, and so on. Memory 510 can include any suitable volatile memory, non-volatile memory, storage, or any suitable combination thereof. For example, memory 510 can include RAM, ROM, EEPROM, one or more flash drives, one or more hard disks, one or more solid state drives, one or more optical drives, and so on. In some embodiments, memory 510 can have encoded thereon, or otherwise stored therein, a computer program for controlling operation of computing device 450. In such embodiments, processor 502 can execute at least a portion of the computer program to present content (e.g., images, user interfaces, graphics, tables), receive content from server 452, transmit information to server 452, and so on.

In some embodiments, server 452 can include a processor 512, a display 514, one or more inputs 516, one or more communications systems 518, and/or memory 520. In some embodiments, processor 512 can be any suitable hardware processor or combination of processors, such as a CPU, a GPU, and so on. In some embodiments, display 514 can include any suitable display devices, such as a computer monitor, a touchscreen, a television, and so on. In some embodiments, inputs 516 can include any suitable input devices and/or sensors that can be used to receive user input, such as a keyboard, a mouse, a touchscreen, a microphone, and so on.

In some embodiments, communications systems 518 can include any suitable hardware, firmware, and/or software for communicating information over communication network 454 and/or any other suitable communication networks. For example, communications systems 518 can include one or more transceivers, one or more communication chips and/or chip sets, and so on. In a more particular example, communications systems 518 can include hardware, firmware and/ or software that can be used to establish a Wi-Fi connection, a Bluetooth connection, a cellular connection, an Ethernet connection, and so on.

In some embodiments, memory 520 can include any suitable storage device or devices that can be used to store instructions, values, data, or the like, that can be used, for example, by processor 512 to present content using display 514, to communicate with one or more computing devices 450, and so on. Memory 520 can include any suitable volatile memory, non-volatile memory, storage, or any suitable combination thereof. For example, memory 520 can include RAM, ROM, EEPROM, one or more flash drives, one or more hard disks, one or more solid state drives, one or more optical drives, and so on. In some embodiments, memory 520 can have encoded thereon a server program for controlling operation of server 452. In such embodiments, processor 512 can execute at least a portion of the server program to transmit information and/or content (e.g., data, images, a user interface) to one or more computing devices 450, receive information and/or content from one or more computing devices 450, receive instructions from one or more devices (e.g., a personal computer, a laptop computer, a tablet computer, a smartphone), and so on.

In some embodiments, image source 402 can include a processor 522, one or more input(s) 524, one or more communications systems 526, and/or memory 528. In some embodiments, processor 522 can be any suitable hardware processor or combination of processors, such as a CPU, a GPU, and so on. In some embodiments, the one or more input(s) 524 are generally configured to acquire data, images, or both, and can include a camera. Additionally or alternatively, in some embodiments, one or more input(s) 524 can include any suitable hardware, firmware, and/or software for coupling to and/or controlling operations of a camera. In some embodiments, one or more portions of the one or more input(s) 524 can be removable and/or replaceable.

Note that, although not shown, image source 402 can include any suitable inputs and/or outputs. For example, image source 402 can include input devices and/or sensors that can be used to receive user input, such as a keyboard, a mouse, a touchscreen, a microphone, a trackpad, a trackball, and so on. As another example, image source 402 can include any suitable display devices, such as a computer monitor, a touchscreen, a television, etc., one or more speakers, and so on.

In some embodiments, communications systems 526 can include any suitable hardware, firmware, and/or software for communicating information to computing device 450 (and, in some embodiments, over communication network 454 and/or any other suitable communication networks). For example, communications systems 526 can include one or more transceivers, one or more communication chips and/or chip sets, and so on. In a more particular example, communications systems 526 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 528 can include any suitable storage device or devices that can be used to store instructions, values, data, or the like, that can be used, for example, by processor 522 to control the one or more input(s) 524, and/or receive data from the one or more input(s) 524; to images from data; present content (e.g., images, a user interface) using a display; communicate with one or more computing devices 450; and so on. Memory 528 can include any suitable volatile memory, non-volatile memory, storage, or any suitable combination thereof. For example, memory 528 can include RAM, ROM, EEPROM, one or more flash drives, one or more hard disks, one or more solid state drives, one or more optical drives, and so on. In some embodiments, memory 528 can have encoded thereon, or otherwise stored therein, a program for controlling operation of image source 402. In such embodiments, processor 522 can execute at least a portion of the program to generate images, transmit information and/or content (e.g., data, images) to one or more computing devices 450, receive information and/or content from one or more computing devices 450, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In an example study, the systems and methods described in the present disclosure were implemented to case study locations on the Menomonee River in Wauwatosa, WI. The selected area of the river was relatively shallow, easy to access, and had available space for the drone to take off and land. At the monitoring location, the river is approximately 21 meter wide and is characterized by a deeper slow flow (upstream) followed by a shallow turbulent flow (downstream) with exposed rocks. Monitoring was conducted during three days. Flights A and B captured data at two elevations, while Flight C captured data at 11 different elevations. The flights captured a range of flow and environmental conditions, with wind speeds ranging from 2.7-8.6 m/s and a variation in cloud cover as indicated by the range in solar radiation. In addition, the flights captured a range of flow conditions from 1 to 30 m$^3$/s.

A DJI Matrice 210RTK was used to collect video data in the field. This has an RTK GPS system that allows for centimeter level accuracy through the combination of drone and ground-based GPS satellite receivers. The RTK system allows this drone to hover steadily in typical environmental conditions within ±0.1 m. This is advantageous as it allows for video collection at steady elevations for consistent pixel resolutions in the estimation of velocity. The drone collected video with a Zenmuse X5S non-zoom camera that filmed in 4K resolution at 30 frames per second.

Flights were conducted at various elevations ranging between 6 m and 61 m. Image data from the lower elevation flights only contained regions of water flow, but with the increasing elevation the videos contained background objects like trees and the bank of the river. In these instances, a consistent region-of-interest was cropped from all of the video image data. As PWC-Net is a neural network trained on 1k-resolution images, the video image data were resampled to 1k resolution. As the elevation increases, the pixel size also increases, the pixel size was also calculated for each elevation. Before and after flights, stream velocity data at the surface were collected at various points within the stream using an OTT MF pro velocity meter. These data were used to compare the results of the optical flow algorithm with what was measured in the stream using hand-held methods.

Figure 6A:
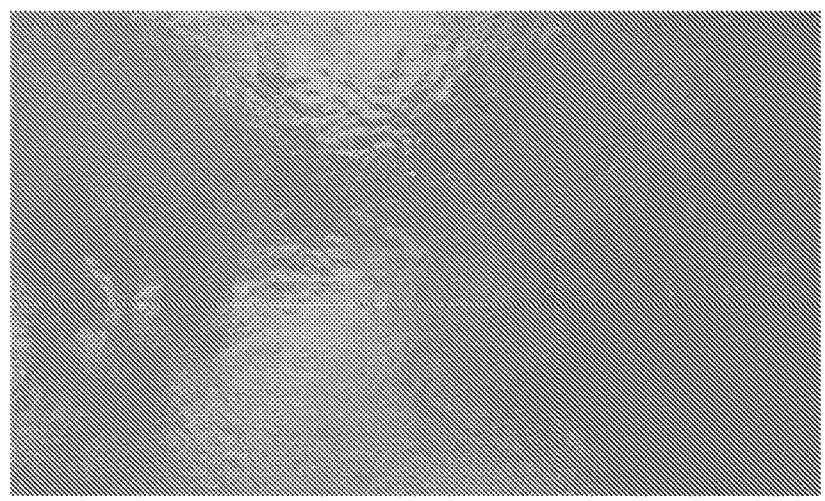
FIGS. 6A-6F illustrate examples of an image from a video (FIG. 6A), a vector flow field (FIG. 6B), a magnitude heatmap (FIG. 6C), a magnitude histogram (FIG. 6D), a phase heatmap (FIG. 6E), and a phase histogram (FIG. 6F).
Figure 6B:
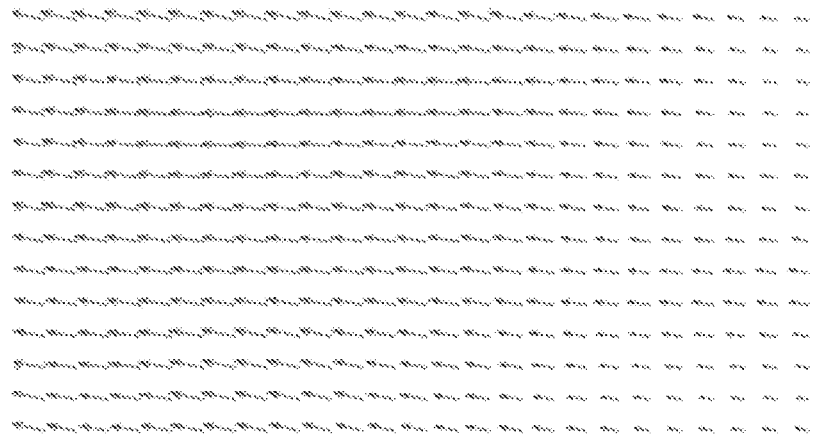
Figure 6C:
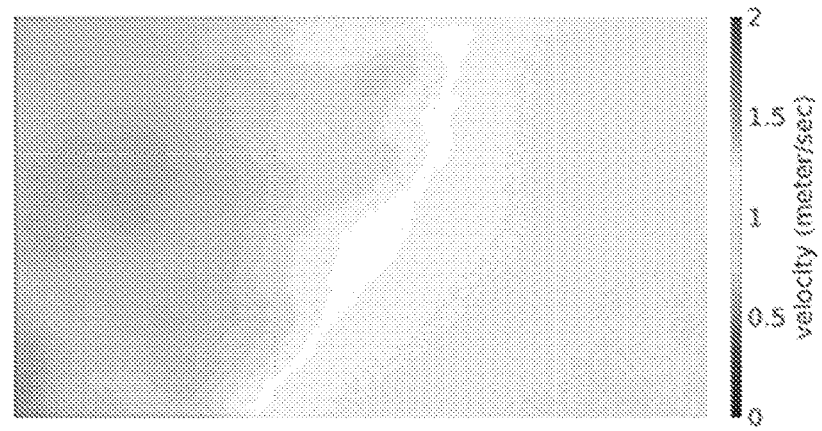
Figure 6D:
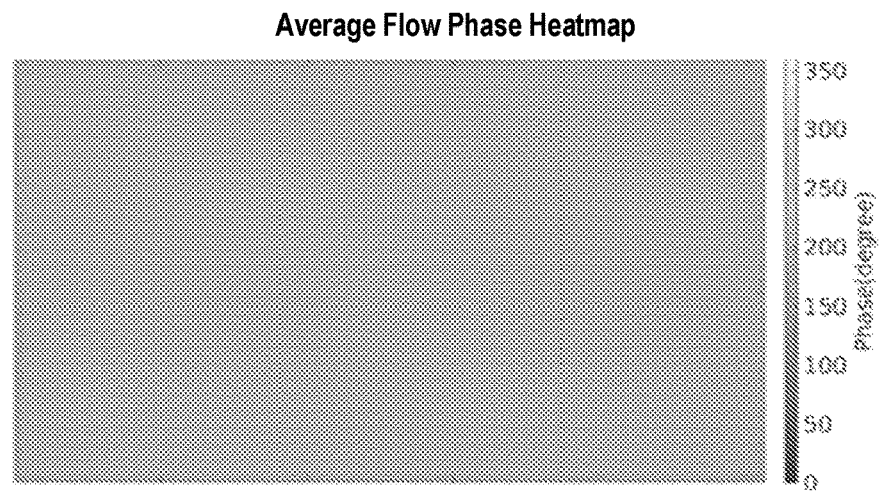
Figure 6E:
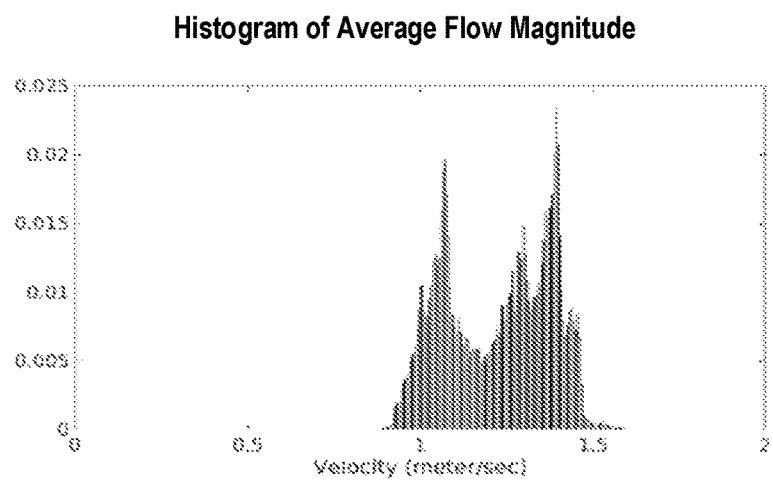
Figure 6F:
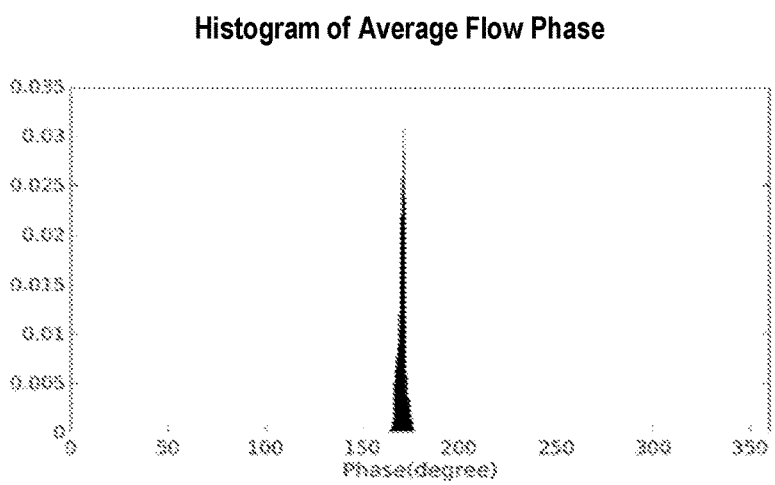

The video collected above the stream was analyzed and velocities were found to be within 13-27% of the hand-held measurements. An example of the results from the video analysis are illustrated in FIGS. 6A-6F for data obtained during Flight C at a 12-meter elevation. The average hand-held velocity was 1.38 m/sec with a phase of about 180 degrees, indicating flow moving from right to left. FIG. 6A shows a single image from the video. Analysis was performed on a 15 second video and the results averaged. FIG. 6B represents the average vector flow field, which in general are pointing downstream in the left direction. An average magnitude heatmap and average magnitude histogram are depicted in FIGS. 6C and 6D, respectively. From the magnitude histogram it can be seen that the mode velocity is around 1.37 m/sec. Both from the average phase heatmap (FIG. 6E) and the average phase histogram (FIG. 6F), it can be seen that the phase is almost constant towards 180 degree.

The elevation at which the drone is flown has a direct impact on the distance that each pixel represents in space. For example, at a 45 m elevation, the pixel size in a 1 K image is 1.6 cm, whereas at 150 m, the corresponding pixel size is approximately 5.3 cm. There may be instances, therefore, in which movement in pixels will be more difficult to detect due to a combination of a large pixel size and a low flow velocity. Likewise, there may be instances in which pixel size is small and velocity is high, resulting in such a high pixel displacement that it is more challenging to capture the movement with the optical flow algorithm. In such instances, it can be advantageous to resample the video resolution in order to overcome limitations of pixel displacements. For example, when the video resolution is too low, the video data can be upsampled. By increasing the video resolution through upsampling, the algorithm is able to recover most of the lost information and detect movement in the surface of the stream. Thus, for videos with low pixel displacement (either due to low video resolution, low stream velocity, or a combination thereof), upsampling of the video can be used to improve algorithm performance.

Figure 7:
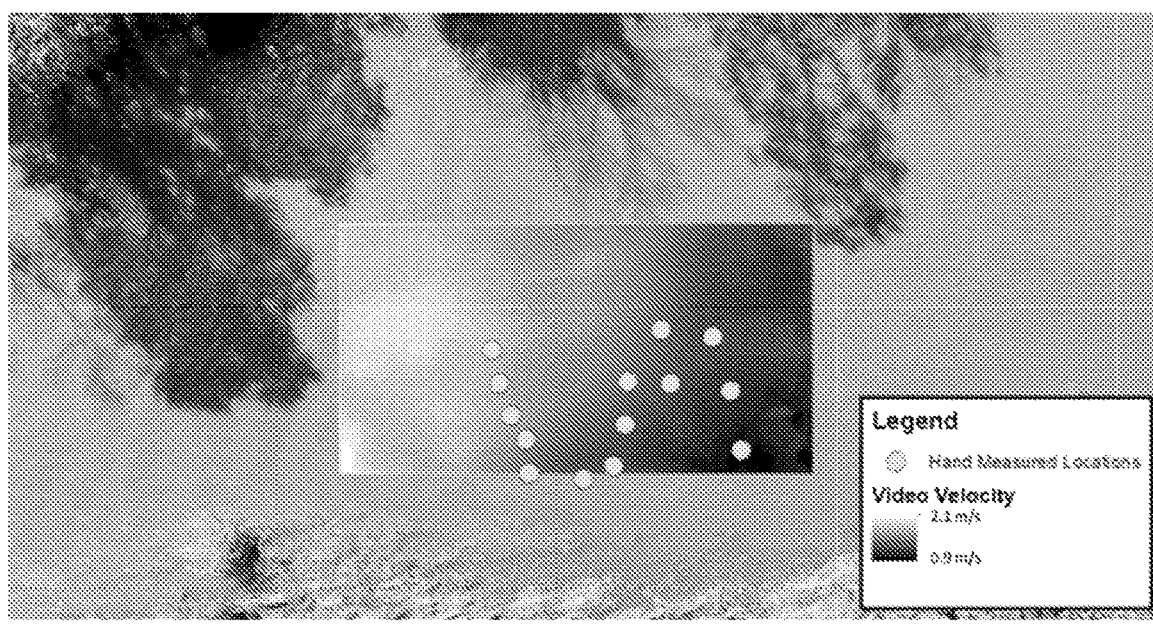
FIG. 7 shows an example location of hand-held velocity measurements and depiction of velocities derived from drone video obtained in an example study.

The hand-held velocity monitoring locations were georeferenced within ArcGIS for comparison with the velocity data estimated from the drone video. An example of those locations from Flight C are illustrated in FIG. 7. For each flight, these measurement locations were different depending upon environmental conditions. For example, during Flight C, the flow within the middle of the river was above chest height, and therefore velocity data was not obtained by hand-held measurement across the entire channel. However, during Flight B the maximum depth was less than one meter and therefore hand-held data were collected across a larger area of the stream.

Figure 8:
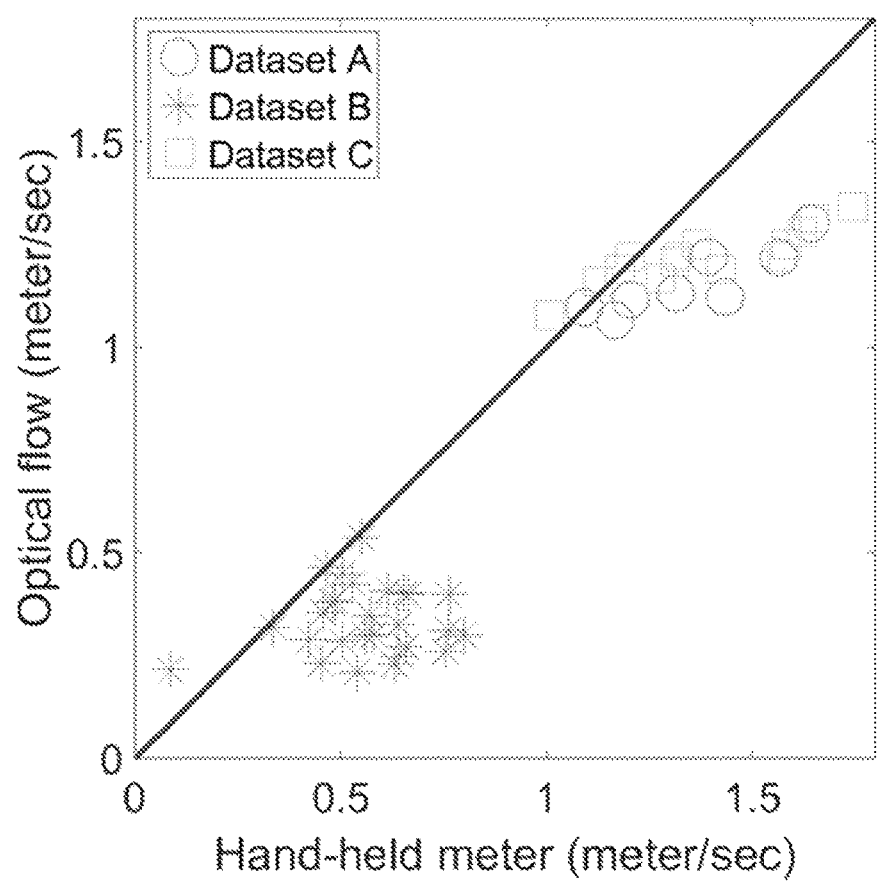
FIG. 8 shows a comparison of velocity data from hand-held and drone derived velocities from 14 points measured in the stream in an example study.

A comparison of the hand-held velocity versus the drone velocity at those points is illustrated in FIG. 8. In FIG. 8, each point corresponds to the flow observed in one of the regions highlighted in FIG. 7, averaged over all the flight altitudes. The drone velocities were within 15%, 27%, and 13% of the hand-held measurements on average for Flights A, B, and C, respectively. The drone estimations are consistently lower than those from the hand-held device. However, an advantage to the systems and methods described in the present disclosure is that it does not require external seeding of the stream, which makes application quicker and easier in the field.

In this work, a novel technique for river velocity estimation using an optical flow algorithm applied to video captured by drones was demonstrated. Results indicated that drone derived velocities were within 12% of velocities measured by hand-held meters. This could provide a valuable alternative to in-stream monitoring systems for estimating stream velocities during extreme flood conditions or in areas that are not easily accessible.

The present disclosure has described one or more preferred embodiments, and it should be appreciated that many equivalents, alternatives, variations, and modifications, aside from those expressly stated, are possible and within the scope of the invention.

The invention claimed is:

1. A method for measuring water flow velocity, comprising:
   obtaining image data of a flowing water source with a camera;
   transmitting the image data to a computer system remote from the camera;
   inputting the image data to a trained machine learning algorithm stored on the computer system, generating output as water flow velocity data, wherein the trained machine learning algorithm implements an optical flow algorithm, wherein the water flow velocity data comprise flow vector field data; and
   computing cumulative flow data from the water flow velocity data by adding the flow vector field data for each of a plurality of pairs of images in the image data.

2. The method of claim 1, further comprising computing average flow magnitude values from the water flow velocity data.

3. The method of claim 2, further comprising generating an average flow magnitude heatmap from the computed average flow magnitude values and displaying the average flow magnitude heatmap to a user.

4. The method of claim 2, further comprising computing a histogram of average flow magnitude from the water flow velocity data.

5. The method of claim 1, further comprising computing average flow phase values from the water flow velocity data.

6. The method of claim 5, further comprising generating an average flow phase heatmap from the computed average flow phase values, and displaying the average flow phase heatmap to a user.

7. The method of claim 5, further comprising computing a histogram of average flow phase from the water flow velocity data.

8. The method of claim 5, wherein the average flow phase values are phase wrapped values, and further comprising unwrapping the average flow phase values in order to identify a true azimuth.

9. The method of claim 1, further comprising computing average flow magnitude values by dividing the cumulative flow data by a number of image pairs in the image data.

10. The method of claim 1, wherein the trained machine learning algorithm comprises a neural network.

11. The method of claim 10, wherein the neural network comprises a PWC-Net architecture.

12. The method of claim 11, wherein the deep neural network is trained on training data comprising video data having a lower spatial resolution than the image data.

13. The method of claim 1, wherein the camera used to obtain the image data is coupled to an unmanned aerial vehicle (UAV).

14. The method of claim 1, wherein the camera used to obtain the image data is coupled to a stationary position above a flow surface of the flowing water source.

15. The method of claim 1, wherein the flowing water source is one of a river, stream, sewer pipe flow, or open channel flow.

16. The method of claim 1, wherein the image data comprise optical image data that depict the flowing water source in a visible spectrum.

17. The method of claim 1, wherein the image data comprise one of multispectral or hyperspectral image data.

18. The method of claim 1, wherein the image data comprise thermal image data.

* * * * *

UNITED STATES PATENT AND TRADEMARK OFFICE
CERTIFICATE OF CORRECTION

| | | |
|---|---|---|
| PATENT NO. | : 12,320,687 B2 | Page 1 of 1 |
| APPLICATION NO. | : 17/791654 | |
| DATED | : June 3, 2025 | |
| INVENTOR(S) | : Henry Ponti Medeiros et al. | |

It is certified that error appears in the above-identified patent and that said Letters Patent is hereby corrected as shown below:

In the Specification

Column 8, Line 18, "$w_{GT}{}^k$" should be --$w_{GT}^k$--.

Column 8, Line 20, "$l_2$" should be --$\ell_2$--.

Signed and Sealed this
Thirtieth Day of September, 2025

John A. Squires
*Director of the United States Patent and Trademark Office*